(12) United States Patent
Cheng et al.

(10) Patent No.: US 9,494,769 B2
(45) Date of Patent: Nov. 15, 2016

(54) MULTI-LENS IMAGING MODULE AND ACTUATOR WITH AUTO-FOCUS ADJUSTMENT

(71) Applicant: Hong Kong Applied Science and Technology Research Institute, Co., Shatin, New Territories (HK)

(72) Inventors: Kwok Sing Cheng, Tuen Mun (HK); Kin Ming Fan, Ngau Tau Kwok (HK)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 363 days.

(21) Appl. No.: 14/024,888

(22) Filed: Sep. 12, 2013

(65) Prior Publication Data

US 2015/0070781 A1  Mar. 12, 2015

(51) Int. Cl.
*G02B 15/14* (2006.01)
*G02B 13/00* (2006.01)
*G02B 7/10* (2006.01)

(52) U.S. Cl.
CPC .............. *G02B 13/009* (2013.01); *G02B 7/102* (2013.01)

(58) Field of Classification Search
CPC .......... G02B 7/09; G02B 7/102; G02B 7/04; G02B 15/14; G02B 13/001; G02B 3/14; G02B 7/14; G02B 2027/0178; G02B 27/0172; G02B 15/20; G02B 13/009; H04N 5/2254; H04N 5/23209; H04N 2213/001; F16F 15/03; F16K 31/0675; F16K 31/082; F16K 7/16; H02K 16/00; H02K 41/031; H02K 41/0356; H02K 2201/18; H02K 33/18; G03B 5/00; G03B 2205/0069; G03B 2205/0046; A61B 17/1628; A61B 2019/5227; G02F 1/29; G02F 2001/294
See application file for complete search history.

(56) References Cited

U.S. PATENT DOCUMENTS

| | | | |
|---|---|---|---|
| 2004/0240052 A1 | 12/2004 | Minefuji et al. | |
| 2007/0223905 A1 | 9/2007 | Nikkanen | |
| 2009/0268309 A1* | 10/2009 | Ke | G02B 7/08 359/698 |
| 2013/0028581 A1 | 1/2013 | Yeung et al. | |

FOREIGN PATENT DOCUMENTS

| | | |
|---|---|---|
| CN | 1831577 A | 9/2006 |
| CN | 101410743 A | 4/2009 |
| CN | 102269857 A | 12/2011 |
| EP | 2135441 B1 | 8/2012 |
| JP | 2006129653 A | 5/2006 |
| WO | WO2012081790 A1 | 6/2012 |

* cited by examiner

*Primary Examiner* — Alicia M Harrington
(74) *Attorney, Agent, or Firm* — Berkeley Law & Technology Group, LLP

(57) ABSTRACT

The subject matter disclosed herein relates to an optical module that includes a plurality of lenses and an electromagnetic actuator to adjust a zoom level or focus of the optical module.

22 Claims, 5 Drawing Sheets

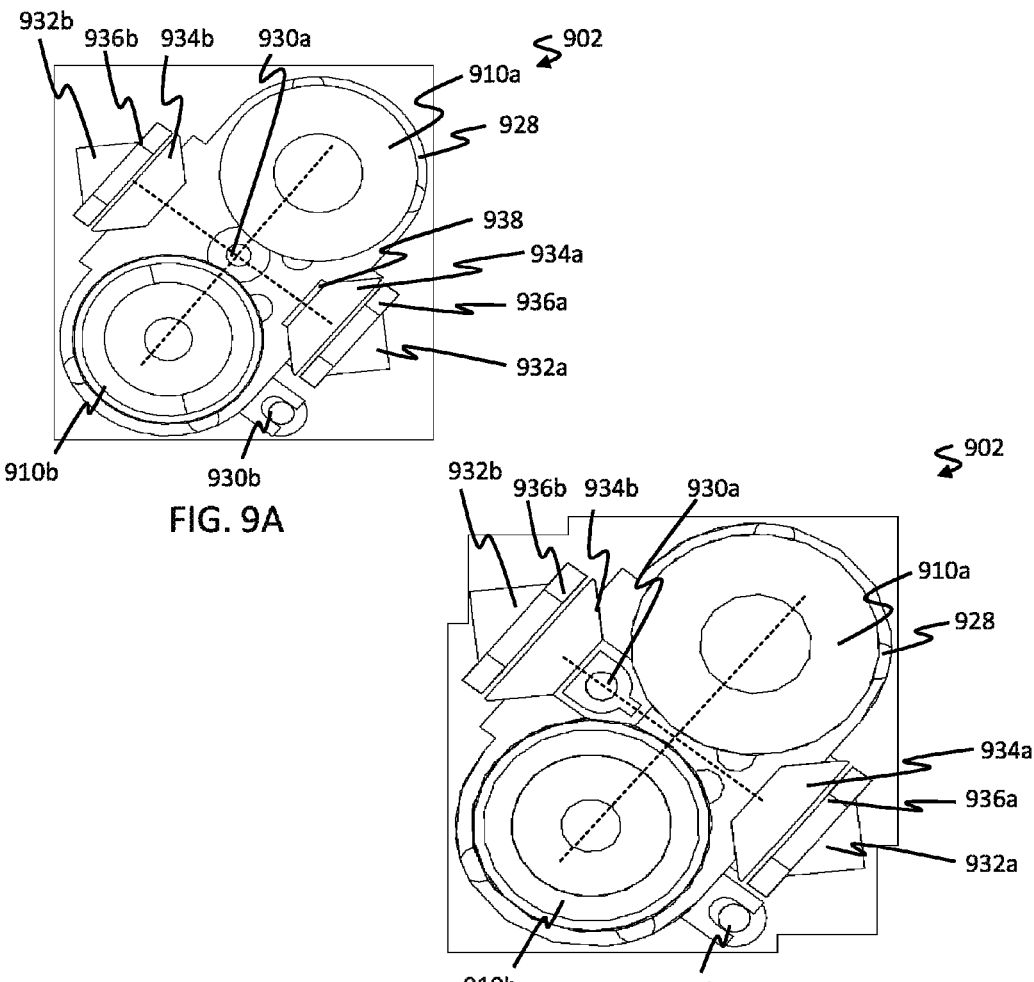

MULTI-LENS IMAGING MODULE AND ACTUATOR WITH AUTO-FOCUS ADJUSTMENT

FIELD

The subject matter disclosed herein relates to an optical module comprising a plurality of lenses and image sensors, and an electromagnetic actuation and restraint mechanism to adjust a focus of the optical module.

BACKGROUND

Many portable electronic apparatuses, including by not limited handheld devices such as cellular phones, tablets, and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can be manufactured with reduced cost by reducing manufacturing tolerances of an optical system of the camera modules.

BRIEF DESCRIPTION OF THE DRAWINGS

Non-limiting and non-exhaustive embodiments will be described with reference to the following objects, wherein like reference numerals refer to like parts throughout the various objects unless otherwise specified.

FIG. 4A is a perspective view of an imaging module, according to an embodiment. FIG. 4B is a top-down view of image sensors and circuitry of an imaging module, according to an embodiment.

FIGS. 9A-9B are top-down views of two embodiments of an imaging module.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

As used to describe such embodiments, terms "above", "below", "upper", "lower", "horizontal", "vertical", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on, "Horizontal" may refer to an orientation perpendicular to an optical axis while "vertical" may refer to an orientation parallel to the optical axis.

Figure 1:
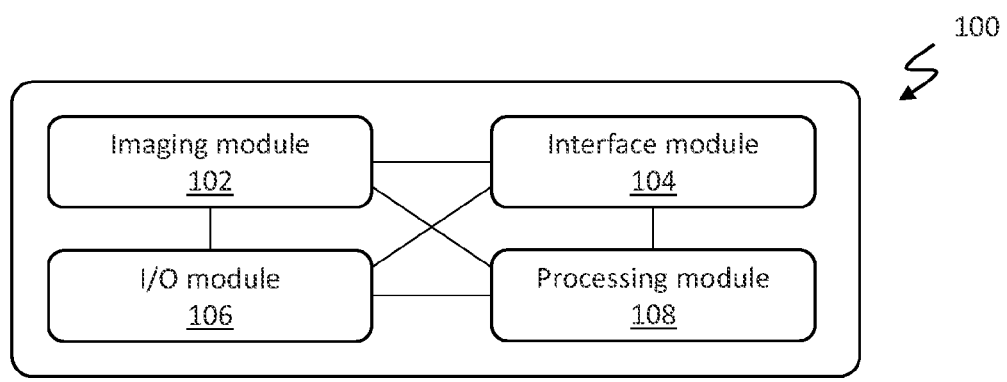
FIG. 1 is a block diagram illustrating a device, according to an embodiment.

Embodiments described herein include an imaging module that provides a mechanism and/or allows a process to select one of two or more individual lens assemblies, and adjusting a focal ratio between the two or more individual lens assemblies and two or more image sensors. FIG. 1 is a block diagram illustrating a device 100 according to one embodiment. Device 100 may comprise any kind or form of device, including, for example, electronic devices such as handheld devices like phones, tablets, and PDAs, cameras, computers, among other things. Device 100 may comprise a plurality of modules related to the operation and/or function thereof. The plurality of modules may comprise hardware, software, and/or a combination thereof. In one embodiment, device 100 may comprise an imaging module 102, an interface module 104, an module 106, and a processing module 108, among other things. Imaging module 102, interface module 104, I/O module 106, and processing module 108 may be communicably coupled together so as to facilitate the transmission and reception of data to and from any one given module.

Imaging module 102 may comprise any suitable module related to imaging. For instance, imaging module 102 may comprise a combination of hardware and/or software in order to facilitate the capture of images of a given scene. For instance, in one embodiment, imaging module 102 may be a component of a camera module of a handheld device.

Interface module 104 may comprise any suitable module relating to an interface with users, devices, and/or other modules of device 100. For instance, interface module 104 may comprise a combination of hardware and/or software capable of facilitating an interface to allow interaction with a user. In one embodiment, interface module 104 may transmit and receive data related to a graphical user interface with which a user may interact. In another embodiment, interface module 104 may facilitate communication with a device external to device 100. For instance, interface module 104 may transmit and/or receive communications related to a device external to device 100.

I/O module 106 may comprise any suitable module relating to the input/output of a device. For instance, I/O module 106 may comprise a combination of hardware and/or software and facilitate functionality relating to the input and output functionality of device 100.

Processing module 108 may comprise any suitable module related to processing, and/or computation of device 100. For instance, in one embodiment, processing module 108 may comprise a processor configured to transmit and receive data and perform different processes related thereto. For instance, processing module 108 may be capable of receiving instructions related to functionality of a module of device 100 and may facilitate the implementation thereof.

In operation, according to one embodiment of device 100, imaging module 102, interface module 104, I/O module 106, and processing module 108 may exchange data as part of the operation of device 100. For instance, a user may attempt to interact with an element of device 100. The user interaction may be represented by a signal. In one embodiment, the signal may originate in I/O module 106. An additional signal related to instructions may be transmitted to processing module 108. In one example, the user interaction may be related to the operation of imaging module 102, such as instructing that imaging module 102 be initialized in preparation of capturing an image. Imaging module 102 may capture an image and may transmit a plurality of signals relating to the same to processing module 108, I/O module 106, and/or interface module 104, among other things. In one example embodiment, the signals related to the captured image may be stored in a memory of device 100 that may comprise a non-transitory computer readable storage medium. The foregoing presents an exemplary description of one possible operation of device 100 and is not to be taken in a restrictive sense.

Figure 2:
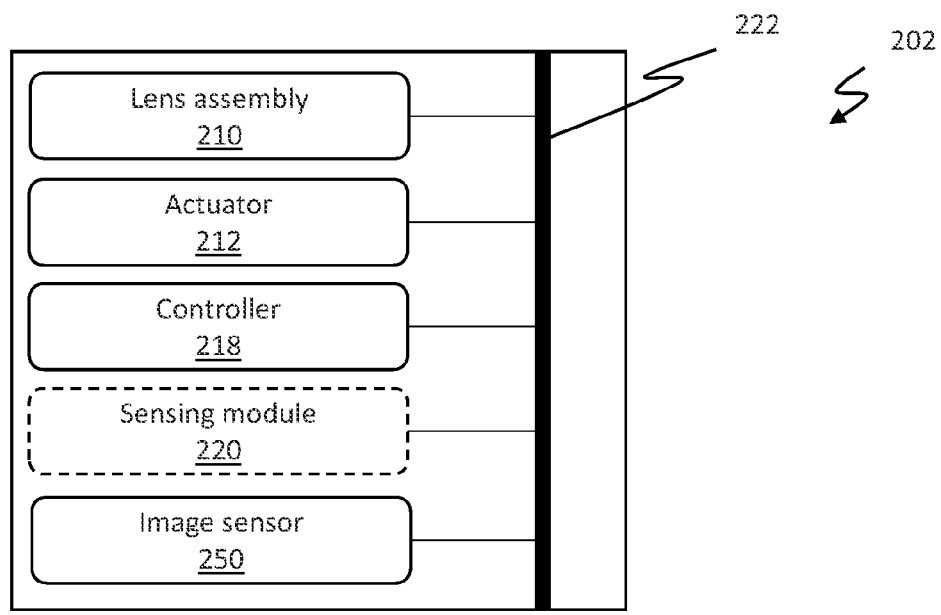
FIG. 2 is a block diagram illustrating an imaging module, according to an embodiment.

FIG. 2 is a block diagram of imaging module 202 according to one embodiment. FIG. 2 illustrates the communicative coupling of different parts of imaging module 202 and is not intended to be interpreted as a literal description of the physical structure of imaging module 202. In this example, imaging module 202 may comprise a combination of hardware and software including, but not limited to, a lens assembly 210, an actuator 212, a controller 218, sensing module 220, and image sensor 250. Imaging module 202 may comprise a bus 222 configured to facilitate the transmission and reception of data between modules of imaging module 202 and/or external modules and devices, among other things. These and other modules that may make up imaging module 202 may comprise any combination of hardware, software, and/or combination thereof.

Lens assembly 210 may comprise a combination of structure, such as glass, plastic, and/or metal, in order to form an element configured to receive and transmit electromagnetic radiation that, in at least one embodiment, may comprise visible light. Of course, lens assembly may comprise other structures and functionality. In one embodiment, lens assembly 210 may comprise a plurality of lens elements (not shown) that may operate in concert to refract light. Imaging module 202 may comprise a plurality of lens assemblies 210 in certain embodiments.

Actuator 212 may comprise any suitable form of actuator capable of moving lens assembly 210 relative to image sensor 250, or vice versa. In one embodiment, actuator 212 may comprise an electromagnetic actuator comprising at least one magnet and at least one coil that may interact with each other via, among other things, electromagnetic forces. Of course, other forms of actuator 212 are contemplated by the present disclosure including, but not limited to electromechanical and piezotube-related actuators.

Controller 218 may comprise hardware, software, and any suitable combination thereof. Controller 218 may, in one embodiment, comprise an I/O mux capable of swapping between a plurality of image sensors 250, among other things. Controller 218 may comprise an ISP module capable of altering characteristics related to lens assembly 210 including, but not limited to, exposure time, f-stop numbers, focal length and ratios, and lens distortion mapping, among other things. For instance, in one embodiment, controller 218 may be capable of determining a distance to an object, a focal length of a lens, and may facilitate lens height adjustment accordingly. In some examples, controller 218 may be integrated into the same chip as one or more image sensors 250. Of course, the preceding and other functionality contemplated for controller 218 may be performed any element or part, and controller 218 may be considered more generally as a symbolic representation of hardware and software configured to contribute to the operation of imaging module 202.

Optional sensing module 220 may comprise any hardware, software, and any combination thereof capable of sensing a position of a lens assembly 210 relative to, for example, an image sensor 250. In one embodiment, sensing module 220 may comprise an element configured to sense a position of lens assembly 210 based on a strength of a magnetic field, for instance. Alternative embodiments may include sensors configured to sense a current or a resistance, among other things. Of course, any other suitable means or mechanism is contemplated under the present disclosure.

Bus 222 may be capable of transmitting and receiving data to and from lens assembly 210, actuator 212, controller 218, sensing module 220, image sensor 250, and devices and modules external to imaging module 202.

In operation, signals may be received at imaging module 202 via bus 222 and may be directed to the appropriate module. Signals may also be transmitted from imaging module 202 via bus 222. Signals may be received and transmitted among modules of imaging module 202 via bus 222.

Figure 3:
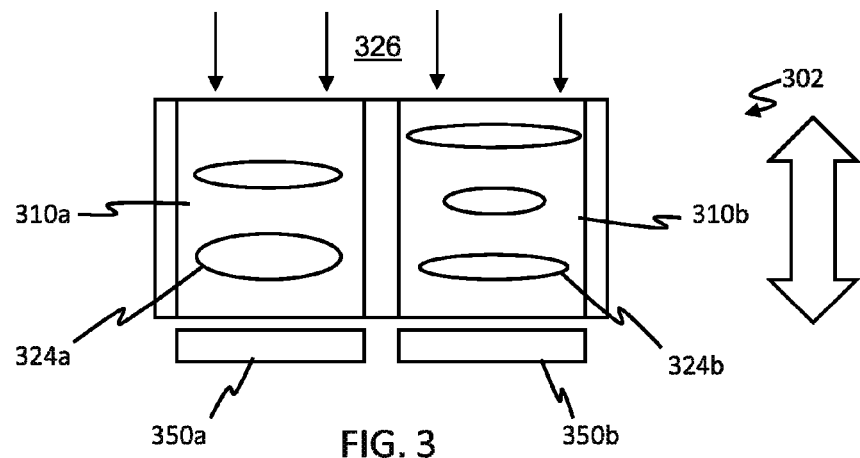
FIG. 3 is a cross section view of an imaging module illustrating operation thereof according to an embodiment.

FIG. 3 illustrates a schematic cross-section view of an imaging module 302. Imaging module 302 may comprise a first lens assembly 310a and a second lens assembly 310b. First and second lens assemblies 310a and 310b may comprise a plurality of optical elements including, but not limited to, first optical element 324a and second optical element 324h. In one example, a first lens assembly 310a may comprise a first set of image characteristics (e.g., zoom, aspect ratio, among other things) and a second lens assembly 420 may comprise a second set of image characteristics. For instance, in one embodiment, first lens assembly 310a may provide a different zoom level than that of second lens assembly 310b. A selected lens assembly (e.g., first lens assembly 310a or second lens assembly 310b) may receive light 326 and provide an image to a respective image sensor 350a or 350b. The image sensor may include an active region (not shown) comprising an array of pixilated charge-coupled devices (CCD) and/or one or more complementary metal-oxide-semiconductor (CMOS) devices, just to name a few examples. Image sensor 350a or 350b may also comprise an inactive region (not shown) at least partially surrounding an active region. Such an inactive region may comprise a border or frame for an active region that may be used to physically support other portions of a compact imaging module without interfering with light impinging on the active region.

In the case shown in FIG. 3, a selected lens assembly may comprise first lens assembly 310a placed near a first image sensor 350a to project an image onto an active region (not shown) of the first image sensor 350a while unselected second lens assembly 310a may be positioned such that any light 326 refracted through optical elements 324a is directed away from first image sensor 350a. Selection of first lens assembly 310a or second lens assembly 310b may be made by selectively receiving signals related to a captured image from either first or second image sensor 350a or 350b. Alternatively, both first and second image sensors 350a and 350b may transmit captured images, and a module of imaging module 302 or other related piece of hardware and/or software may selective use and/or discard signals from first and second image sensor 350a and 350b. An imaging module 302 may also allow focus adjustments by selectively changing a distance between individual lens assemblies (e.g., 310a or 310b) and an image sensor, such as first image sensor 350a. For example, first lens assembly 310a and second lens assembly 310b may be moved in a direction indicated by the double arrow in FIG. 3. A distance between first lens assembly 310a and first image sensor 350a, for example, may be adjustable, at least in part, in response to an electromagnetic force generated by one or more magnets and a coil, as described below.

A selected lens assembly may comprise first lens assembly 310a placed near a first image sensor 350a to provide an image onto an active region (not shown) of first image sensor 350a. Second lens assembly 310b may be placed near a second image sensor 350b to provide an image onto an active region (not shown) of second image sensor 350b. In one embodiment, both first and second image sensors 350a and 350b may receive light 326, but only one of first and second image sensors 350a and 350b may be configured to transmit data related to an image to be used by imaging module 302. However, other embodiments are contemplated by the present disclosure.

Imaging module 302 may also allow focus adjustments by selectively changing a distance between individual lens assemblies, first lens assembly 310a and second lens assembly 310b, and an image sensor (e.g., 350a or 350b). A distance between a lens assembly, such as first lens assembly 310a, and an image sensor, such as a first image sensor 350a, for example, may be adjustable, at least in part, in response to a mechanical force or an electromagnetic force, for example. A distance may be measured along an optical axis of the lens assembly. In an implementation, a mechanical force may be used to adjust focus of the first and second lens assemblies 310a and 310b. In another implementation, an electromagnetic force may be used to adjust focus of the first and second lens assemblies 310a and 310b. In one embodiment, the electromagnetic force may be generated by two or more coils and two or more arrays of magnets, as described below. In a particular embodiment, for example, a structure comprising an imaging module 302, may provide zoom capability, auto-focus, and/or other imaging functions by adjusting a distance between individual lens assemblies and an image sensor. An imaging module 302 may provide an advantage to designers incorporating such a module into increasingly slimmer, smaller, and/or lighter portable electronic apparatuses, such as a compact camera or cell phone, for example. Of course, such details of a compact imaging module are merely examples, and claimed subject matter is not so limited.

In one embodiment, a compact imaging module may comprise a first lens assembly 310a having a first effective focal length and a second lens assembly 310b having a second effective focal length. The term "effective focal length" refers to a focal length of an assembly of individual lenses, as opposed to a focal length of an individual lens. A magnification or zoom level of a lens assembly may be based, at least in part, on the effective focal length of the lens assembly. Accordingly, a first lens assembly 310a having a first effective focal length may produce an image having one zoom level and a second lens assembly 310b having a second effective focal length may produce an image having another zoom level. In one implementation, imaging module 302 may comprise one or more sensors (not shown) to detect a position of the movable platform. For example, position sensors may detect a horizontal and/or vertical position of the movable platform 110 with respect to a reference position.

An imaging module 302 may comprise a combination of magnets and coils to move a movable platform (not shown) in a first direction to change a distance between an image sensor, such as first image sensor 350a and first lens assembly 310a. The combination of magnets and coils may generate attractive, repulsive or other forces in response to receiving electrical current. In one example, a source of electromagnetic power may comprise a first and a second magnet and a first and second coil, for example. In a further example, a first coil may comprise one or more coils arranged in proximity to a first magnet, and a second coil may comprise one or more coils arranged in proximity to a second magnet.

Motion of the first and second lens assemblies 310a and 310b may occur in at least a first direction, as illustrated by the double arrow in FIG. 3. For instance, motion in this direction may comprise a linear vertical motion. Movement in this direction may change a distance between a lens assembly (e.g., 310a or 310b) and an image sensor (e.g., 350a or 350b), and/or may adjust a focus of the lens assemblies (e.g., 310a or 310b) with respect to the image sensor (e.g., 350a or 350b). In other words, a distance between a lens assembly (e.g., 310a or 310b) and an image sensor (e.g., 350a or 350b) may be adjusted so that a focused image produced by the lens assembly is received by the relevant image sensor (e.g., 350a or 350b).

In one embodiment, an electromagnetic actuator may provide a continuous, linear motion no that distance between a selected lens assembly (e.g., 310a or 310b) and an image sensor (e.g., 350a or 350b) may be adjusted by any amount. Such adjustments may be made, for example, to focus an image of a lens assembly, such as 310a, onto an image sensor, such as 350a. For example, the electromagnetic actuator may produce varying magnitudes of vertical displacement of a portion of a movable lens platform. Such varying magnitudes may provide varying distances between a lens assembly and an image sensor to precisely control a focus of light onto the image sensor.

In one embodiment, an imaging module 302 may comprise a movable lens platform. The movable lens platform may support a first lens assembly 310a having a first effective focal length and a second lens assembly 310b having a second effective focal length. For example, the first and second lens assemblies, 310a and 310b, may be mounted to and physically supported by a portion of the lens platform. An image sensor 350a may receive light 326 from a first lens assembly 310a if the lens platform, and an image sensor 350b may receive light 326 from a second lens assembly 310b, and imaging module 302 and/or another module or device may determine which image sensor, 350a or 350b, to use.

In one embodiment, the lens platform may be configured to move in a vertical direction, as shown by the arrow, to change a distance between an image sensor 350a and first lens assembly 324a. Focus of either of the lens assemblies may be adjusted by such changing of the distance. Of course, such details of a compact imaging module are merely examples, and claimed subject matter is not so limited.

Figure 4A:
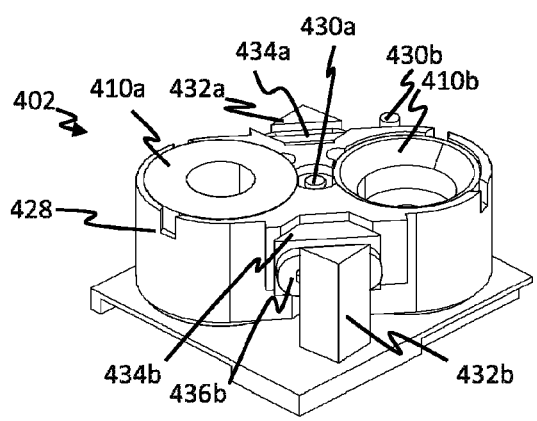
FIGS. 4A-4B illustrate elements of an imaging module according to some embodiments.

FIG. 4A is a perspective view of an imaging module 402. Imaging module 402 may comprise a lens platform 428 comprising a plurality of image assemblies, such as a first lens assembly 410a and a second lens assembly 410b. In one embodiment, first lens assembly 410a may comprise a first effective focal length and second lens assembly 410b may comprise a second effective focal length. Lens platform 428 may be slidably connected to one or more guides, such as guide 430a and 430b, and may be capable of moving along said one or more guides. Lens platform 428 may also be fixably connected to one or more magnets, such as first magnet 434a and second magnet 434b. Additionally, a first structure 432a and a second structure 432b may be arranged in proximity to lens platform 428. A first coil 436a may be fixably connected to the first structure 432a and a second coil 436b may be fixably connected to a second structure 432b. First and second coils 436a and 436b and first and second structures 432a and 432b may be arranged in proximity to first and second magnets 434a and 434b, respectively. In one embodiment, first and second structures 432a and 432b are stationary or fixed relative to lens platform 428. As used herein, a given coil is in proximity to a given magnet if arranged such that an electromagnetic field existing between the given coil and the given magnet and each of the given coil and the given magnet may be arranged in an electromagnetic field of the other, and/or vice versa. First lens assembly 410a may be arranged in relation to a first image sensor 450a (see FIG. 4B), and second lens assembly 410b may be arranged in relation to a second image sensor 450b (see FIG. 4B). The combination of first and second coils 436a and 436b and first and second magnets 434a and 434b may be considered an electromagnetic actuator.

In one embodiment, a magnet, such as first magnet 434a, may comprise a permanent magnet made from a material that is magnetized to create its own persistent magnetic field. Such a material may comprise, for example, a ferromagnetic material such as iron, nickel, cobalt, or some alloys of rare earth metals, just to name a few examples. A coil, such as second coil 436b, may comprise a wound coil, a printed coil, or an electroplated coil on a substrate, for example. Of course, such details of a compact imaging module are merely examples, and claimed subject matter is not so limited.

In one embodiment, first lens assembly 410a and second lens assembly 410b may be fixably connected to lens platform 420 and may therefore be capable of moving vertical or otherwise changing a distance between the first and second lens assemblies 410a and 410b and the first and second image sensors 450a and 450b. An electromagnetic actuator comprising a plurality of magnets and coils, such as first and second magnets 434a and 434b and first and second coils 436a and 436b. A repulsive force and/or an attractive force may be created by the electromagnetic actuator and may induce movement of lens platform 428 and/or first and second lens assemblies 410a and 410b. For example, in one implementation, a current may be pulsed to both first and second coils 436a and 436b and may thus create an electromagnetic field. First and second magnets 434a and 434b may comprise a polarity and be arranged such that the created magnetic field creates and attractive force that induces movement in a first direction, and concurrently a repulsive force may be created to induce movement in the first direction.

Imaging module 402 may also include a restraint mechanism integrated or separate from the electromagnetic actuator. For instance, imaging module 402 may include a mechanical, electromagnetic, or otherwise restraint mechanism to constrain movement of lens platform 428 and/or first and second lens assemblies 410a and 410b. In one example, an electromagnetic actuator of imaging module 402 may induce movement of lens platform 428, and once lens platform 428 is in a desired position, a restraint mechanism may retain lens platform 428 in place.

Figure 4B:
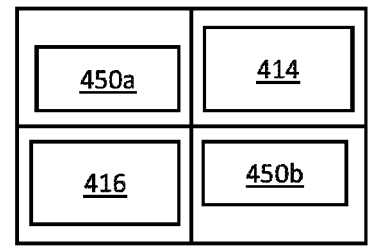

FIG. 4B illustrates a portion of imaging module 402 comprising a first image sensor 450a and a second image sensor 450b. In one embodiment, imaging module 502 may also comprise a controller configured to facilitate the operation and/or function thereof. For instance, the controller may facilitate frame swapping between first and second image sensors 450a and 450b. In another example, the controller may facilitate adjusting an exposure time of a first or second lens assembly 410a or 410b. The controller may also facilitate a height adjustment of first and second lens assemblies 410a and 410b. The controller may also facilitate lens distortion mapping, among other things. In one embodiment, the controller may be integrated on a same chip or board as first and second image sensors 450a and 450b. In one implementation, a controller may comprise a plurality of distinct subparts. For instance, a dedicated I/O mux 414 may control frame swapping, among other things. In another example, and ISP module 416 may control exposure time, lens height adjustment, and lens distortion mapping, among other things.

In operation, an imaging module 402 may receive a signal related to a command to capture an image of a scene. Light entering imaging module 402 may pass through or be otherwise refracted by first and second lens assemblies and impact upon first and second image sensors 450a and 450b. In one embodiment, I/O mux 414 will activate only one of first or second image sensors 450a and 450b depending on the received signal. In another embodiment, both first and second image sensors 450a and 450b may remain active and a signal related to an image may only be transmitted from a preselected image sensor, either 450a or 450b. In yet another embodiment, signals related to an image may be transmitted from both first and second image sensors 450a and 450b.

Upon reception of the signal related to the command to capture an image of a scene, ISP module 416 may determine or otherwise detect a need to adjust a distance between first and second lens assemblies 410a and 410b and first and second image sensors 450a and 450b. In one embodiment, a signal may be transmitted to an electromagnetic actuator of imaging module 402. For example, one or more current pulses may be sent to first and second coils 436a and 436b. In response to the one or more current pulses, first and second lens assemblies 410a and 410b may move to a desired position. In one example, a minimum position of lens platform 428 may correspond to a minimum distance between first and second lens assemblies 410a and 410b and first and second image sensors 450a and 450b. A maximum position of lens platform 428 may correspond to a maximum distance between first and second lens assemblies 410a and 410b and first and second image sensors 450a and 450b. In some embodiments, movement of lens platform 428 and first and second lens assemblies 410a and 410b may be configured to be substantially continuous between the maximum and minimum positions. Thus, at least in theory, an infinite number of positions of lens platform 428 may exist between the minimum and maximum extremes. In one example, a plurality of pulses may be transmitted to an electromagnetic actuator in order to arrive at a desired focus level. For example, the distance between first and second lens assemblies 410a and 410b and first and second image sensors 450a and 450b may be fed through a closed-loop system comprising a feedback loop and whereby the desired distance may be fed back through and fine-tuned until reaching a desired distance/focus. Once in the desired position, a restraint mechanism may maintain said desired position. In another example, the signal received related to capturing an image may engender a signal related to an exposure time or lens distortion mapping among other things.

Figure 5:
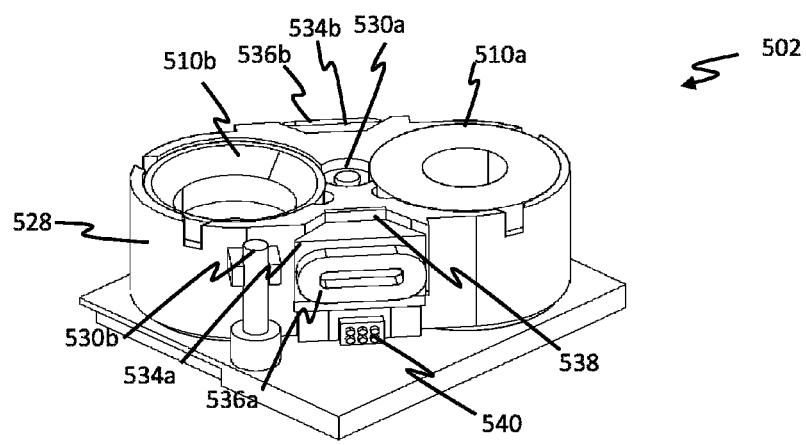
FIG. 5 is a perspective view of an imaging module according to another embodiment.

FIG. 5 is a perspective view of an imaging module 502 according to one embodiment. The imaging module 502 in FIG. 5 does not include the first and second structures 432a and 432b discussed in relation to FIG. 4A. Imaging module 502 may comprise a first and a second lens assembly 510a and 510b. In one embodiment, first lens assembly 510a may comprise a first zoom level and second lens assembly 510b may comprise a second zoom level. In another embodiment, first lens assembly 510a may comprise a wide angle lens and second lens assembly 510b may comprise a narrow angle lens. First and second lens assemblies 510a and 510b may be connected to a lens platform 528. In one embodiment, first and second lens assemblies 510a and 510b may be integrated into lens platform 528 to form a unitary element, in other embodiments, first and second lens assemblies 510a and 510b may be removable from lens platform 528.

First and second lens assemblies 510a and 510 may be slidably connected to a first guide 530a and configured to move in a first direction along first guide 530a. In one embodiment, first and second lens assemblies 510a, and 510b may be connected to first guide 530a via lens platform 528. Imaging module 502 may also comprise a second guide 530b. The combination of first and second guides 530a and 530b may facilitate movement of first and second lens assemblies 510a and 510b in a balanced fashion, for instance, to avoid one of first and second lens assemblies 510a, and 510b from moving more or less than the other. The unbalanced movement that might occur if one of the first and second lens assemblies 510a and 510b moves more or less than the other along first guide 530a, may be referred to as optical tilting. Optical tilting may occur in a variety of situations and first and second guides 530a and 530 may work together to attempt to reduce said optical tilting.

A sensor 540 may be coupled to lens platform 528 of imaging module 502 in order to detect a position of first or second lens assemblies 510a and 510b relative to an image sensor (not shown) and/or first guide 530a. Sensor 540 may be configured to detect the position of first and/or second lens assemblies 510a and 510b based on changes in electromagnetic fields, based on optics, or any other suitable device or means.

In operation, imaging module 502 may receive a signal related to capturing an image with one of first and second lens assemblies 510a and 510b. In this example, the received signal may related to capturing an image with the first lens assembly 510a. Sensor 540 may sense or otherwise detect a position of first lens assembly 510a and may determine that first lens assembly 510a should move to a second position. A current may be pulsed to first and second coils 536a and 536b inducing an electromagnetic force between first and second magnets 534a and 534b relative to first and second coils 536a and 536b. First lens assembly 510a may move based on the induced electromagnetic force. Sensor 540 may again attempt to sense the position of first lens assembly 510a to determine whether first lens assembly 510a is in the predetermined second position. In another embodiment, sensor 540 may be configured to continually sense the position of first lens assembly 510a and facilitate a signal to stop pulsing current to first and second coils 536a and 536b. Other embodiments are also contemplated, including using a lookup table to determine the amount of current pulses necessary, and using incremental discrete current pulses in a closed loop system, among other things.

Once current pulses are no longer transmitted to first and second coils 536a and 536b, imaging module 502 may comprise a restraint mechanism configured to retain first lens assembly 510a in the desired position. For instance, in one example, imaging module 502 may comprise an isolating element 538 that may be configured to isolate first guide 530a from first magnet 534a while nevertheless exposing first guide 530a to an electromagnetic field emanating from second magnet 534b. In this embodiment, once current pulses are no longer transmitted to first and second coils 536a and 536b, an electromagnetic field and/or magnetic force between second magnet 534b and first guide 530a may be such as to induce a slight horizontal movement of lens platform 528 toward first guide 530a and may induce a frictional force between lens platform 528 and first guide 530a. In one example, the induced frictional force may be sufficient to constrain movement of lens platform 528 and first and second lens assemblies 510a and 510b. In one embodiment, the creation of an electromagnetic field from second coil 536b may be sufficient to overcome the frictional force. Of course, this is but one example of a suitable restraint mechanism. A variety of other restraint mechanism, including other electromagnetic systems, mechanical systems, and electromechanical systems are also contemplated by the present disclosure.

Figure 6A:
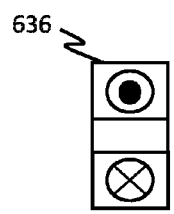
FIGS. 6A-6D illustrate different views of an electromagnetic actuator according to different embodiments.
Figure 6A:
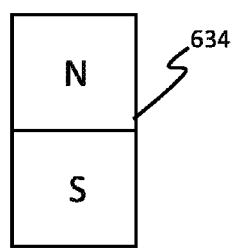

FIGS. 6A-6D further illustrate operation of one embodiment of an electromagnetic actuator according to the present disclosure. FIG. 6A is a cross-section illustrating a coil 636 and a magnet 634. Magnet 634 may be arranged in a variety of polarities, but in FIG. 6A, magnet 634 is illustrated with a northern polarity N arranged above a southern polarity S. Coil 636 may be illustrated with one portion of the loop marked with a solid circle '•' and a second portion of the loop marked with an 'x'. This designation has been applied arbitrarily and does not necessarily indicate that current is flowing through coil 636.

Figure 6B:
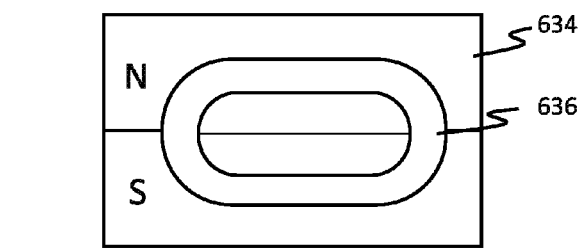

FIG. 6B is a side view illustrating a coil 636 being arranged proximate to magnet 634. As was the case in FIG. 6A, magnet 634 may comprise a portion of a polarity N and a portion of a polarity S. In one embodiment, coil 636 may be configured to receive current pulses. As current pulses travel through coil 636, an electric field may form around coil 636 and relative to magnet 634. As has been discussed above, the formation of an electric field may lead to the creation of electromagnetic forces that may include an attractive force and a repulsive force in one embodiment.

Figure 6C:
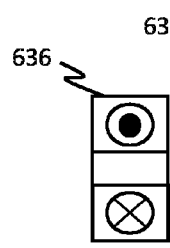
Figure 6D:
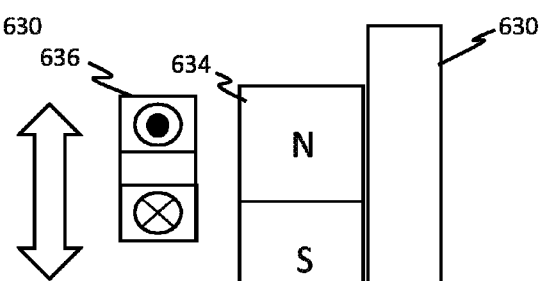

FIGS. 6C and 6D illustrate the operation of an electromagnetic actuator comprising a coil 636 and a magnet 634 relative to a guide 630. In one embodiment, magnet 634 may be connected to a lens platform (not shown) as discussed above. Magnet 634 may comprise a portion of a polarity N and a portion of a polarity S. Magnet 634 may straddle coil 636. A current may be pulsed through coil 636 and may induce the creation of electromagnetic forces that may propel magnet 634 in a first direction relative to guide 630 as illustrated by the double arrow between FIGS. 6C and 6D. For instance, FIG. 6D illustrates one example where an electromagnetic force between coil 636 and magnet 634 may cause magnet 634 to move to a second position. Once magnet 634 and lens platform (not shown) are in a desired position relative to guide 630, a restraint mechanism may constrain further movement thereof. Additional current pulses of the same or differing magnitudes and polarities may be applied to coil 636 to induce further motion.

Figures 7A, 7B:
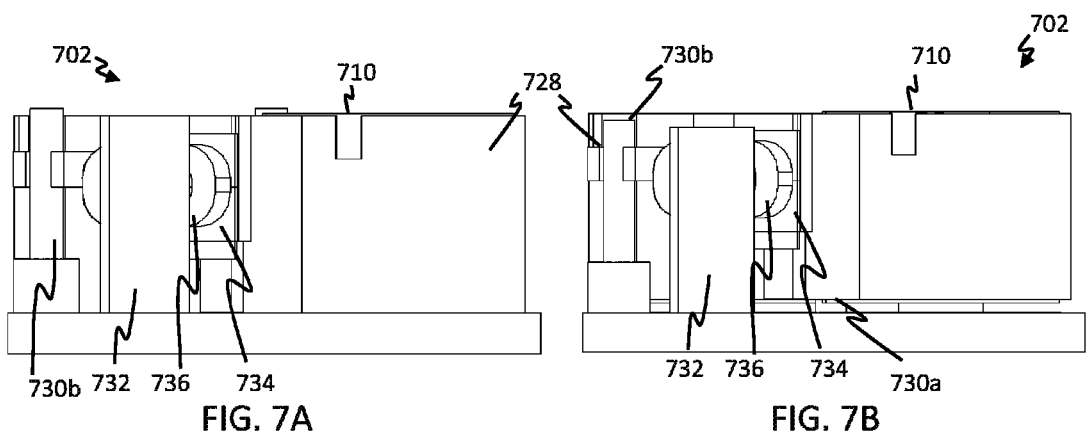
FIGS. 7A and 7B are side views of an imaging module, according to an embodiment, and illustrate possible operation thereof.

FIGS. 7A and 7B are a side-view of imaging module 702 illustrating movement of lens platform 728 relative to first and second guides 730a and 730b, to which platform 728 may be slidably connected. In one embodiment, lens platform 728 may comprise one or more lens assemblies such as lens assembly 710. Lens platform 728 may be fixably connected to magnet 734, and a coil 736 may be connected to a structure 732 proximate to magnet 734.

In one embodiment, a current pulse may be transmitted to coil 736 and may induce an electromagnetic force between coil 736 and magnet 734. The induced electromagnetic three may induce movement of lens platform 728 from a first position illustrated in FIG. 7A to a second position illustrated in FIG. 7B. A restraint mechanism may retain lens platform 728 in a given position if no current is pulsed to coil 736. One or more additional current pulses may be applied to coil 736 in order to cause additional movement of lens platform 728.

Figure 8:
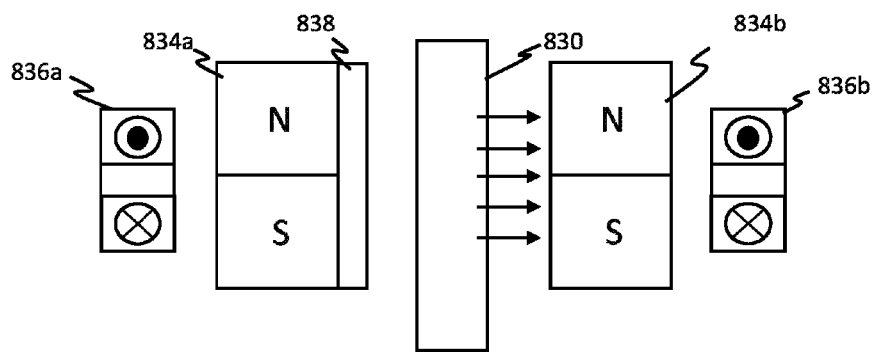
FIG. 8 is a side view of a plurality of magnets and coils of an electromagnetic actuator, according to an embodiment.

FIG. 8 illustrates one restraint mechanism according to the present disclosure. Of course, one of ordinary skill in the art would appreciate that any number of other suitable implementations of a restraint mechanism may also exist and be contemplated by the present disclosure. In this example, a lens platform (not shown) may be connected to a first magnet 834a and a second magnet 834b. The lens platform may be slidably connected to a guide 830. An isolating element 838 may be arranged between first magnet 834a and guide 830 and may operate to isolate guide 830 from first magnet 834a isolating element 838 may comprise any suitable material for isolating guide 830 from an electromagnetic field of first magnet 834a. Guide 830 may comprise any suitable material that may react to electromagnetic fields, including those created by first and second coils 836a and 836b and/or first and second magnets 863a and 863b. For instance, in one example, guide 830 may comprise a metal and/or metal alloy, among other things. Guide 830 may be arranged in proximity to first and second magnets 834a and 834b in one example.

In operation, current pulses may be sent to first and second coils 836a and 836b thus inducing motion of first and second magnets 834a and 834b relative to guide 830. Once first and second magnets 834a and 834b reach a desired position, first and second coils 836a and 836b may cease receiving the current pulses. In one example, once first and second coils 836a and 836b no longer induce an electromagnetic field, an magnetic force between guide 830 and second magnet 834b may be sufficient to induce slight movement of the lens platform (not shown) and/or second magnet 834b toward guide 830. A frictional force between the lens platform and/or second magnet 834b and guide 830 may form and may be sufficient to retain the position of second magnet 834b. In order to once again induce movement of first and second magnets 834a and 834b relative to guide 830, current pulses may once again be received at first and second coils 836a and 836b sufficient to overcome the frictional force constraining movement. The foregoing comprises but one example of a multitude of possible restraint mechanisms contemplated by the present disclosure. It is not to be taken in a restrictive sense.

FIGS. 9A and 9B illustrate two examples of imaging module 902 according to the present disclosure. As has been mentioned previously, one challenge in adjusting a focus of a multi-lens system is avoiding and/or reducing optical tilting. For instance, if a distance between a first lens assembly and a first image sensor differs significantly from a distance between a second lens assembly and a second image sensor wherein the first and second lens assemblies are on the same lens platform, captured images may exhibit negative imaging effects including, but not limited to, image blur.

FIG. 9A is a top-down view of an imaging module 902 according to one embodiment, which may be configured to avoid optical tilting. Imaging module 902 comprises a first lens assembly 910a and a second lens assembly 910b arranged in a lens platform 928, which is slidably connected to first and second guides 930a and 930b. Lens platform 928 may also be connected to first and second magnets 934a and 934b, which may be arranged in proximity to first and second coils 936a and 936b. First and second coils 936a and 936b may be attached to first and second structures 932a and 932b, respectively. An isolating element 938 may be arranged relative to first magnet 934a and first guide 930a in order to facilitate restraint of movement thereof, among other things.

The arrangement of first and second magnets 934a and 934b may be complementary in nature, relative to first guide 930a. For instance, if a first imaginary straight line (illustrated by broken line) is traced through the optical axes of first and second lens assemblies 910a and 910b, the first straight line will traverse the center of first guide and divide lens platform 928 into two symmetrical portions. As such, the arrangement of first and second magnets 934a and 934b in each of the two symmetrical portions of lens platform 928 is complementary in nature in FIG. 9A in that is balances the two symmetrical portions of lens platform 928. Indeed, in one embodiment, each of first and second magnets 934a and 934b may be centered on a second imaginary straight line running perpendicular to the first imaginary straight line and centered on the axis of first guide 930a. Of course, one of ordinary skill in the art would recognize that a plurality of other possible implementations are supported by the present disclosure.

FIG. 9B illustrates a second embodiment of an imaging module 902 comprising first and second magnets arranged in a complementary manner. However, in FIG. 9B, first guide 930a is offset slightly. According to this embodiment, first guide 930a is arranged to be closer to second magnet 934b and outside of an electromagnetic field of first magnet 934a. In this particular embodiment, an isolating element, like isolating element 938 in FIG. 9A, may be unnecessary for the operation of the restraint mechanism of imaging module 902. For instance, when no current is flowing through first and second coils 936a and 936b, first guide 930a may be arranged such that it interacts with an electromagnetic field from second magnet 934b and not an electromagnetic field from first magnet 934a. The magnetic force between first guide 930a and second magnet 934b may induce a frictional force therebetween and thereby constrain movement of lens platform 928. In one such embodiment, a current pulsed to first coil 936a may be different from a current pulsed to second coil 936b in order to overcome the electromagnetic force between first guide 930a and second magnet 934b and/or to overcome optical tilting, among other things.

One skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
   a plurality of lens assemblies connected to a lens platform;
   the lens platform slidably connected to a guide; and
   an electromagnetic actuator comprising:
   a first magnet connected to the lens platform and arranged in proximity to a first coil; and
   a second magnet connected to the lens platform at a position complementary to the first magnet, and arranged in proximity to a second coil;
   wherein the electromagnetic actuator is configured to change a distance between the plurality of lens assemblies and a plurality of image sensors, and
   further wherein the electromagnetic actuator is configured such that if no current is applied to the electromagnetic actuator, a magnetic force between the second magnet and the guide induces movement of the lens platform relative to the guide and further induces a frictional force between the lens platform and the guide such that the lens platform remains stationary as to the guide.

2. The apparatus of claim 1 wherein the first coil is connected to a first fixed structure and the second coil is connected to a second fixed structure.

3. The apparatus of claim 1 further comprising an isolating element arranged between the first magnet and the lens platform.

4. The apparatus of claim 3 wherein the isolating element is configured to isolate the guide from an electromagnetic field of the first magnet.

5. The apparatus of claim 4 wherein the guide is exposed to a electromagnetic field emanating from the second magnet.

6. The apparatus of claim 1 wherein a first lens assembly of the plurality of lens assemblies is arranged in relation to a first image sensor of the plurality of image sensors, and a second lens assembly is arranged in relation to a second image sensor of the plurality of image sensors.

7. The apparatus of claim 1 further comprising a controller to change the distance between the plurality of lens assemblies and the plurality of image sensors.

8. The apparatus of claim 1 wherein the first and second magnets are symmetrically arranged around a second imaginary axis running through an axis of the guide and perpendicular to a first imaginary axis running through an optical axis of the plurality of lens assemblies and the axis of the guide.

9. The apparatus of claim 1 wherein the guide is arranged such that a distance between the guide and the first magnet is less than a distance between the guide and the second magnet.

10. The apparatus of claim 1 further comprising a sensor capable of sensing a position of the plurality of lens assemblies relative to the plurality of image sensors.

11. An apparatus comprising:
    an imaging module comprising:
    at least a first lens assembly arranged side-by-side as to a second lens assembly;
    at least a first and a second image sensor corresponding to the at least the first and the second lens assemblies;
    an electromagnetic actuator comprising a first portion and a second portion, the first and second portions fixably connected to and complementarily positioned relative to each other and to the at least the first and the second lens assemblies, the electromagnetic actuator capable of moving the at least the first and the second lens assemblies parallel to an optical axis of the at least the first and the second lens assemblies; and
    a restraint mechanism configured to constrain movement of the at least the first and the second lens assemblies in the absence of current to the electromagnetic actuator.

12. The apparatus of claim 11 wherein the first lens assembly comprises a first zoom level and the second lens assembly comprises a second zoom level.

13. The apparatus of claim 11 wherein the first and second portions of the electromagnetic actuator comprise a first and a second magnet, respectively.

14. The apparatus of claim 13 wherein the electromagnetic actuator further comprises a first coil arranged in proximity to the first portion, and a second coil arranged in proximity to the second portion.

15. The apparatus of claim 11 wherein:
    the imaging module comprises a guide upon which the first and the second lens assemblies may move parallel to the optical axis of the first and the second lens assemblies; and
    the restraint mechanism comprises an isolating element arranged between the guide and the first portion of the electromagnetic actuator.

16. The apparatus of claim 15, wherein a frictional force between the at least the first and the second lens assemblies and the guide is responsive to a magnetic force between the electromagnetic actuator and the guide.

17. The apparatus of claim 11, wherein the at least the first and second lens assemblies are controllable by the electromagnetic actuator to move in a balanced fashion.

18. The apparatus of claim 11, wherein the restraint mechanism is configured to induce a frictional force on the lens assemblies caused by a magnetic force of the electromagnetic actuator to constrain movement of the at least the first and the second lens assemblies in the absence of current to the electromagnetic actuator.

19. A method comprising:
pulsing a current to a plurality of complementarily positioned coils connected to fixed structures external to at least a first lens assembly arranged side by side with a second lens assembly, wherein the current pulse changes a focal distance of the at least the first and the second lens assemblies; and
responsive to an absence of current to the coils, constraining movement of the at least the first and the second lens assemblies via a passive restraint element that induces a frictional force upon the at least the first and the second lens assemblies.

20. The method of claim 19 wherein the pulsing the current induces an electromagnetic force between at least one of the plurality of complementarily positioned coils, and at least one of a plurality of magnets connected to the at least the first and the second lens assemblies.

21. The method of claim 19 wherein the passive restraint element comprises a magnet and a metallic guide.

22. The method of claim 19 further comprising pulsing an additional current sufficient to overcome a force of the passive restraint element.

* * * * *